(12) United States Patent
Jahrmarcht

(10) Patent No.: US 12,546,395 B2
(45) Date of Patent: Feb. 10, 2026

(54) SLIDE RING

(71) Applicant: Siemens Energy Global GmbH & Co. KG, Munich (DE)

(72) Inventor: Steffen Jahrmarcht, Duisburg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/835,849

(22) PCT Filed: Jan. 6, 2023

(86) PCT No.: PCT/EP2023/050238
§ 371 (c)(1),
(2) Date: Aug. 5, 2024

(87) PCT Pub. No.: WO2023/147956
PCT Pub. Date: Oct. 10, 2023

(65) Prior Publication Data
US 2025/0189039 A1  Jun. 12, 2025

(30) Foreign Application Priority Data
Feb. 7, 2022 (EP) .................................. 22155333

(51) Int. Cl.
*F16J 15/34* (2006.01)
(52) U.S. Cl.
CPC ................. *F16J 15/3496* (2013.01)
(58) Field of Classification Search
CPC ............... F16J 15/34; F16J 15/3496
See application file for complete search history.

(56) References Cited

U.S. PATENT DOCUMENTS

| | | | |
|---|---|---|---|
| 5,593,164 A | 1/1997 | Mraz et al. | |
| 6,017,036 A | 1/2000 | Murphy | |
| 7,581,734 B1 | 9/2009 | Mcleod | |
| 2009/0060408 A1* | 3/2009 | Nagasaka | C23C 16/274 384/625 |
| 2009/0189355 A1* | 7/2009 | Ueda | B29B 7/22 277/350 |
| 2014/0205781 A1 | 7/2014 | Ballard et al. | |
| 2016/0091094 A1* | 3/2016 | Devitt | F04D 29/0513 277/401 |
| 2020/0332896 A1* | 10/2020 | Hayashi | F16J 15/102 |

(Continued)

FOREIGN PATENT DOCUMENTS

| | | |
|---|---|---|
| CN | 109505982 A | 3/2019 |
| DE | 69322236 T2 | 1/1999 |
| EP | 3742027 A1 | 11/2020 |

(Continued)

OTHER PUBLICATIONS

European Search Report, Application No. 22155333.2; Date of Mailing: Jul. 8, 2022, 13 pages.

(Continued)

*Primary Examiner* — Gilbert Y Lee
(74) *Attorney, Agent, or Firm* — Cantor Colburn LLP; Georg Nemec

(57) ABSTRACT

The invention relates to a slide ring having an inner surface arranged so as to face a shaft in operation, the inner surface being formed with a coating, the coating including a polymer, in particular polyetheretherketone (PEEK).

16 Claims, 1 Drawing Sheet

(56) References Cited

U.S. PATENT DOCUMENTS

2022/0396056 A1* 12/2022 Kerber .................. B32B 27/308

FOREIGN PATENT DOCUMENTS

| GB | 1388682 A | 3/1975 |
|----|-----------|--------|
| WO | 2023147956 A1 | 8/2023 |

OTHER PUBLICATIONS

International Search Report and Written Opinion for International Application No. PCT/EP2023/050238; International Filing Date: Jan. 6, 2023; Date of Mailing: Mar. 3, 2023, 12 pages.

* cited by examiner

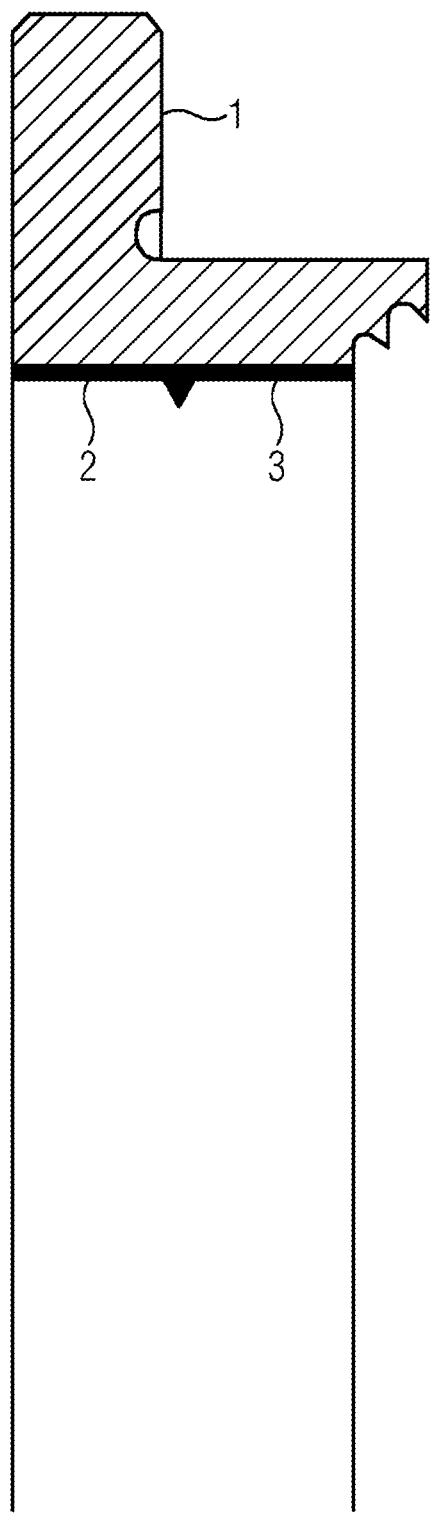

SLIDE RING

BACKGROUND

The invention relates to a slip ring having an inner surface disposed opposite a shaft in operation, wherein the inner surface has been formed with a coating.

The invention further relates to a process for producing a slip ring having an inner surface disposed opposite a shaft in operation.

Gas seals are the preferred seal form for turbomachines, especially compressors in the form of turbomachines, at relatively high pressures because of the comparatively low level of leakage. By comparison with the conventional labyrinth seal, for example, the lower leakage of the dry gas seal by one order of magnitude enables a significant increase in efficiency of the corresponding turbomachine.

Compared to labyrinth seals, which are of comparatively simple construction, modern dry gas seals are comparatively demanding with regard to operating conditions. Reliable operation requires a correspondingly processed and cleaned barrier gas. In addition, dry gas seals are reliant on a particular minimum speed for reliable operation.

The gas seals mentioned at the outset generally have a rotating seal ring and a stationary seal ring opposite one another at a seal plane with a radial extent and with a seal surface on each of the seal rings. In order that the sealing principle can be implemented successfully, it is necessary for the seal surfaces of the two seal rings to be worked precisely and aligned to one another such that a lubricant film of the sealing gas forms between the seal surfaces under reproducible operating conditions and the seals can accordingly work contactlessly. The high precision demands under all conceivable operating conditions are generally achieved only with a particular selection of materials. It is consequently the case that the rotating and stationary seal rings regularly do not have a one-piece connection to the rotor or stator, and the stationary seal ring is regularly also under elastic tension against the rotating seal ring. The rotating seal ring is fixed on the rotor so that there are no uncontrolled relative movements, particularly in axial direction. In the case of conventional seal arrangements, fretting is a common occurrence at the axial contact between the rotating seal ring and a corresponding axial contact shoulder of the rotor, since conventional arrangements enable axial relative movement.

The most commonly used seal types in the case of shaft seals under compressive stress are slip ring seals. They are capable of autonomously compensating for thermal expansions and wear, and as a result have lower maintenance intensity compared to stuffing box packing, as formerly used. In addition, they have significantly lower friction and leakage than the stuffing box packings used previously. Fields of use for slip ring seals range from pumps to centrifuges and compressors, among other applications.

Sealing is effected between a ring which is connected to and rotates with the shaft and a stationary ring disposed in the housing. Depending on the design, the plane in which the two rings make contact, which is also referred to as seal gap, may lie parallel to the shaft axis. In this case, such a seal is referred to as a radial seal. In another case, the plane may be at right angles to the shaft axis. In this case, the seal is referred to as an axial slip ring seal.

Axial slip ring seals consist of a slip ring and a counterpart ring. The slip ring refers to that part which is pressed against the seal partner and is capable of changing its axial position. It may be either the rotating component or the stationary component, and in both cases is nevertheless called slip ring. The counterpart ring is accordingly the component that cannot change its axial position and constitutes the seal partner for the slip ring.

A change in axial position is required firstly owing to different thermal expansions, and also owing to dimension-altering wear to the seal rings, in order to keep the seal gap at the same level. Slip ring seals have the advantage of being able to compensate for wear. The energy for axial movement of the slip ring is obtained from a previously deformed elastic element. It is possible, for example, to use a simple spring as energy storage means for axial movement. The resulting force on the slip ring, plus the force from the operating pressure, taking account of the area ratio, results in pressing of the slip ring against the counterpart ring and closes the seal gap. This force is opposed by the gap-opening parameters of hydrostatic and hydrodynamic gap pressure. In the case of a stationary shaft, the seal bodies are pressed against one another by the pretensioning of the elastic elements and the seal gap is closed. In operation, by contrast, in the most favorable case, given careful design and manufacture, the seal surfaces are fully separated from one another and a load-bearing seal gap of the medium to be sealed of less than 1 µm is established. The complex tribological effects give rise to particular demands on the materials of the actual slip rings and counterpart rings. The fact that slip ring seals are usually used in aggressive media further increases the demands on the materials.

The slip rings should have good thermal conductivity in order to be able to remove the heat and also to be resistant to thermal shock, in order not to be damaged as a result of significant temperature fluctuations.

It is customary to provide the slip rings, which in some embodiments are also referred to as floating rings, with a Babbitt coating in order to assure dry-running properties and to avoid damage to the shaft in the event of collisions. This Babbitt coating is subject to corrosion, as a result of which it can be damaged and can no longer fulfill its purpose. Particularly in the case of compressor applications with a hydrogen sulfide content ($H_2S$), the copper content in the alloy can result in significant corrosion. This leads, among other effects, to higher leakage, lower efficiency, shorter machine service life and higher demand for replacements.

SUMMARY

Proceeding from the known problems and disadvantages of the prior art, it is an object of the invention to specify a slip ring with which improved slip ring properties can be achieved.

It is a further object of the invention to specify a process for producing an improved slip ring.

The object directed to the device is achieved by a slip ring having an inner surface disposed opposite a shaft in operation, wherein the inner surface has been formed with a coating, wherein the inner surface has a porous structure, wherein a polymer is disposed in the porous structure, wherein the coating is disposed on the porous structure formed by the polymer, wherein the coating (3) includes a material composed of polymer.

The object directed to the process is achieved by a process for producing a slip ring having an inner surface disposed opposite a shaft in operation, wherein a porous structure is applied on the inner surface, wherein molten polymer material is introduced into the porous structure, wherein a layer of polymer is applied to the porous structure formed by molten polymer.

The subsidiary claims that are dependent on and refer back to claim 13 relate to advantageous developments of the invention.

It is therefore an essential feature of the invention that the Babbitt coating be replaced by a polymer coating. For this purpose, a polymer is used, since this has excellent corrosion resistance, mechanical properties, wear resistance and suitability for high temperatures.

In particular, the thermoplastic polymer used is polyetheretherketone (abbreviation: PEEK), since it has particularly excellent corrosion resistance, mechanical properties, wear resistance and suitability for high temperatures.

Further suitable polymers are polyaryletherketones (PAEK), which include polyetherketoneketones (PEKK) and the particularly suitable polyetheretherketones (PEEK), polyhaloolefins, which include polytetrafluoroethylene (PTFE), polyamideimide (PAI), polyphenylene sulfide (PPS), ethylene-chlorotrifluoroethylene (ECTFE) and polyimide (PI).

However, the thermal expansion of the polymers, especially of polyetheretherketone (PEEK), is very different compared to the substrate, for example steel. This would lead to delamination of the coating since it shrinks on cooling. In order to avoid this, according to the invention, a porous structure is applied on the inner surface of the slip ring. The polymer, especially polyetheretherketone (PEEK), is melted into this structure having cavities in the coating process, which leads to a firm form-fitting bond of substrate and coating. Multiple layers of a pure coating of polymer, especially polyetheretherketone (PEEK), are applied to the surface thus obtained. This results in a gradient material transition.

Polyetheretherketone is a thermoplastic polymer of high thermal stability and forms part of the substance group of the polyaryl-etherketones. Its melting temperature is 335° C.

Polyetheretherketone (PEEK) is a semicrystalline thermoplastic polymer. Even under thermal stress, it shows excellent lubricant properties in conjunction with very good mechanical properties.

The above-described properties, features and advantages of this invention and the manner in which they are achieved become more clearly and distinctly comprehensible in association with the description of the working examples that follows, which are elucidated in detail in association with the drawings.

Identical components or components having the same function are identified here by the same reference numerals.

Working examples of the invention are described hereinafter with reference to the drawings. These are not intended to show the working examples to scale; instead, the drawing, where useful for elucidation, is executed in schematic and/or slightly distorted form. With regard to additions of the teachings that are immediately apparent in the drawing, reference is made to the relevant prior art.

BRIEF DESCRIPTION OF THE DRAWINGS

FIG. 1 is a schematic diagram of a slip ring of the sealing arrangement in accordance with an exemplary embodiment.

DETAILED DESCRIPTION

FIG. 1 shows a schematic diagram of an inventive slip ring 1. The way in which a slip ring 1 works in a seal is sufficiently well known. Therefore, there will be no description at this point of the way in which a slip ring 1 works as part of a seal.

The slip ring 1 is formed in a circle around an axis of rotation (not shown). In operation, a shaft is disposed on an inner surface 2 of the slip ring 1. The shaft rotates at high speeds in operation. In order that damage between the shaft and the slip ring 1 is minimized in the event of unwanted contact, the inner surface is formed with a coating 3.

This coating 3 includes a polymer. In particular, the coating is formed from polyetheretherketone. Polyetheretherketone is a thermoplastic polymer of high thermal stability and forms part of the substance group of the polyaryletherketones. Its melting temperature is 335° C.

Polyetheretherketone (PEEK) is a semicrystalline thermoplastic polymer. Even under thermal stress, it shows excellent lubricant properties in conjunction with very good mechanical properties.

Further suitable polymers are polyaryletherketones (PAEK), which include polyetherketoneketones (PEKK) and the particularly suitable polyetheretherketones (PEEK), polyhaloolefins, which include polytetrafluoroethylene (PTFE), polyamideimide (PAI), polyphenylene sulfide (PPS), ethylene-chlorotrifluoroethylene (ECTFE) and polyimide (PI).

The slip ring 1 is formed here over its entire circumference on the inner surface 2 by the coating 3 of polyetheretherketone.

The slip ring 1 is used particularly where high shaft speeds occur, for example in turbomachines, especially in compressors or turbocompressors.

The slip ring 1 is produced as described below. A porous structure is applied to the inner surface 2 of the slip ring 1. The porous structure includes cavities. This porous structure can be produced by a additive manufacturing method.

In a next step, molten polymer, especially polyetheretherketone (PEEK), is introduced into the porous structure. In other words: molten polymer, especially polyetheretherketone (PEEK), is introduced into the cavities. This leads to a firm form-fitting bond of substrate and coating. This gives rise to a base material having a surface having particular surface properties.

In a next step, a layer of polymer, especially polyetheretherketone (PEEK), especially pure polyetherether-ketone (PEEK), is applied to the surface.

Multiple layers of a pure coating of polyetheretherketone (PEEK) are applied to the surface thus obtained. This gives rise to a gradient material transition.

The invention claimed is:

1. A slip ring having an inner surface disposed opposite a shaft in operation, wherein the inner surface has been formed with a coating, wherein the inner surface has a porous structure comprising a plurality of cavities, wherein a first polymer is disposed in the porous structure, wherein an interface between the porous structure and the coating is characterized by a firm form-fitting bond resulting from melting the first polymer into the plurality of cavities, wherein the coating is disposed on the porous structure formed by the melted first polymer, wherein the coating comprises a material composed of a second polymer.

2. The slip ring as claimed in claim 1, wherein the coating comprises polyaryletherketones (PAEK).

3. The slip ring as claimed in claim 1, wherein the coating comprises polyetheretherketones (PEEK).

4. The slip ring as claimed in claim 1, wherein the coating comprises polyetherketoneketones (PEKK).

5. The slip ring as claimed in claim 1, wherein the coating comprises polyhaloolefins.

6. The slip ring as claimed in claim 5, wherein the coating comprises polytetrafluoroethylene (PTFE).

7. The slip ring as claimed in claim 1, wherein the coating comprises polyamideimide (PAI).

8. The slip ring as claimed in claim 1, wherein the coating comprises polyphenylene sulfide (PPS).

9. The slip ring as claimed in claim 1, wherein the coating comprises ethylene-chlorotrifluoroethylene (ECTFE).

10. The slip ring as claimed in claim 1, wherein the coating comprises polyimide (PI).

11. The slip ring as claimed in claim 1, wherein the inner surface is in circumferential circular form and the polymer is disposed entirely on the circumference.

12. The slip ring as claimed in claim 1, wherein the slip ring is designed for use in a turbomachine, especially a compressor or turbocompressor.

13. A process for producing a slip ring having an inner surface disposed opposite a shaft in operation, wherein a porous structure is applied on the inner surface, the porous structure comprising a plurality of cavities formed by an additive manufacturing method, wherein molten polymer is introduced into the porous structure to fill the plurality of cavities, wherein a layer of polymer is applied to the porous structure formed by molten polymer, wherein an interface between the porous structure and the layer of polymer is characterized by a firm form-fitting bond resulting from melting the molten polymer into the plurality of cavities.

14. The process for production as claimed in claim 13, wherein a further layer of polymer is applied to the layer of polymer.

15. A process for producing a slip ring having an inner surface disposed opposite a shaft in operation, wherein a porous structure is applied on the inner surface, the porous structure comprising a plurality of cavities, wherein molten polyetheretherketone is introduced into the porous structure to fill the plurality of cavities, wherein a layer of polyetheretherketone is applied to the porous structure formed by molten polyetheretherketone, wherein an interface between the porous structure and the layer of polyetheretherketone is characterized by a firm form-fitting bond resulting from melting the molten polyetheretherketone into the plurality of cavities.

16. The process for production as claimed in claim 15, wherein a further layer of polyetheretherketone is applied to the layer of polyetheretherketone.

* * * * *